United States Patent
Guido et al.

(10) Patent No.: US 10,097,816 B2
(45) Date of Patent: Oct. 9, 2018

(54) METHOD AND APPARATUS FOR CALIBRATING A DYNAMIC AUTO STEREOSCOPIC 3D SCREEN DEVICE

(71) Applicant: NINTENDO CO., LTD., Kyoto (JP)

(72) Inventors: Sebastien Guido, Saint-Ouen (FR); Janos Boudet, Paris (FR); François-Xavier Pasquier, Paris (FR)

(73) Assignee: Nintendo Co., Ltd., Kyoto (JP)

( * ) Notice: Subject to any disclaimer, the term of this patent is extended or adjusted under 35 U.S.C. 154(b) by 118 days.

(21) Appl. No.: 15/062,732

(22) Filed: Mar. 7, 2016

(65) Prior Publication Data
US 2016/0277728 A1 Sep. 22, 2016

(30) Foreign Application Priority Data
Mar. 20, 2015 (EP) .................................... 15305407

(51) Int. Cl.
| | |
|---|---|
| H04N 13/04 | (2006.01) |
| H04N 13/327 | (2018.01) |
| H04N 13/302 | (2018.01) |
| H04N 13/371 | (2018.01) |
| H04N 13/376 | (2018.01) |
| H04N 13/31 | (2018.01) |
| H04N 13/366 | (2018.01) |
| H04N 13/305 | (2018.01) |

(52) U.S. Cl.
CPC .......... *H04N 13/327* (2018.05); *H04N 13/302* (2018.05); *H04N 13/31* (2018.05); *H04N 13/366* (2018.05); *H04N 13/371* (2018.05); *H04N 13/376* (2018.05); *H04N 13/305* (2018.05)

(58) Field of Classification Search
CPC .......... H04N 13/0402; H04N 13/0472; H04N 13/0404; H04N 13/0409; H04N 13/0425; H04N 13/0468; H04N 13/0477
USPC .......................................................... 348/51
See application file for complete search history.

(56) References Cited

U.S. PATENT DOCUMENTS

| | | |
|---|---|---|
| 2010/0245824 A1 | 9/2010 | Schwarz et al. |
| 2013/0127842 A1 | 5/2013 | Lee et al. |
| 2013/0182083 A1 | 7/2013 | Grossmann |

OTHER PUBLICATIONS

Search Report for EP 15305407, dated Sep. 4, 2015, 8 pages.

*Primary Examiner* — Nguyen Truong
(74) *Attorney, Agent, or Firm* — Nixon & Vanderhye P.C.

(57) ABSTRACT

The proposed solution is a calibration process for a dynamic auto-stereoscopic 3D device using an image capture by the camera of the device of the auto-stereoscopic screen through a reflecting surface. The process may also compute the horizontal phase of the parallax barrier.

17 Claims, 8 Drawing Sheets

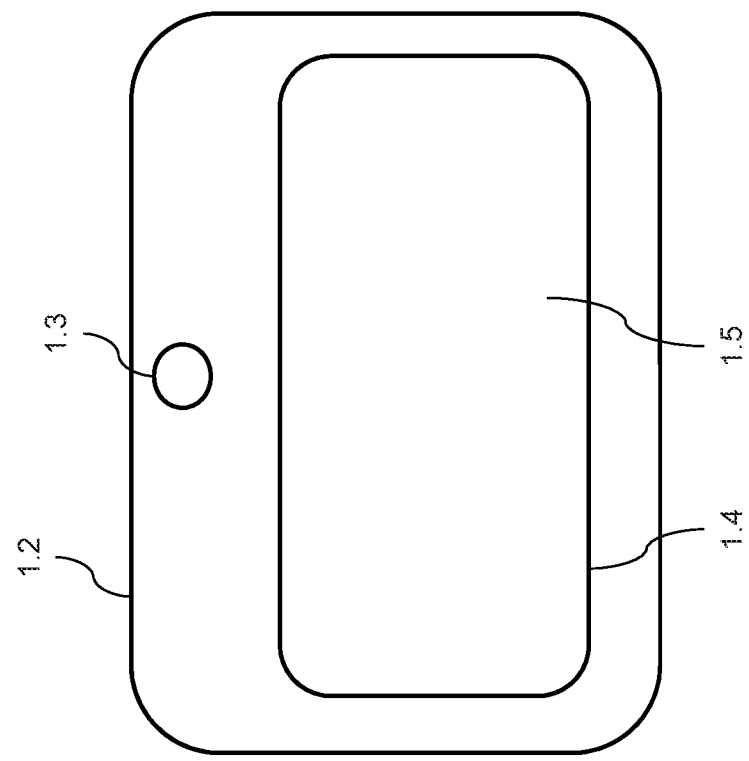
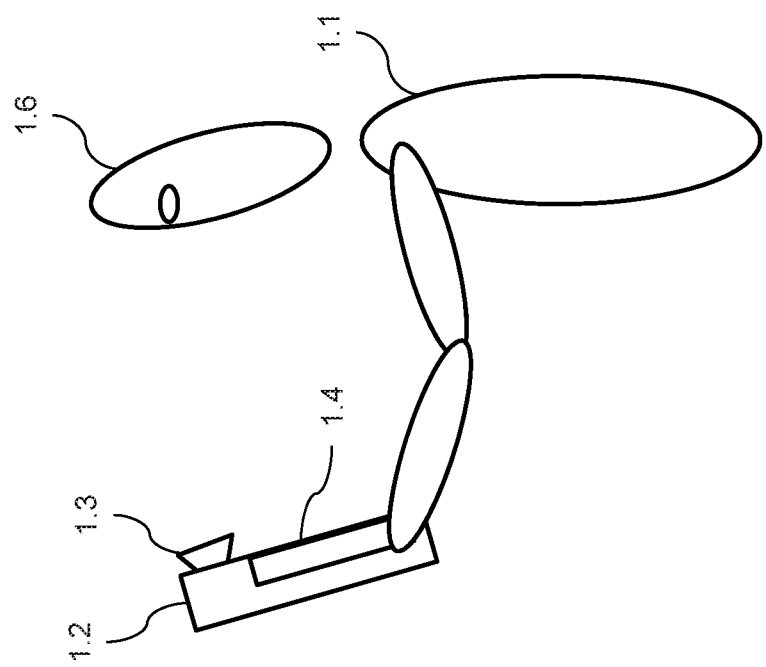
Fig. 1

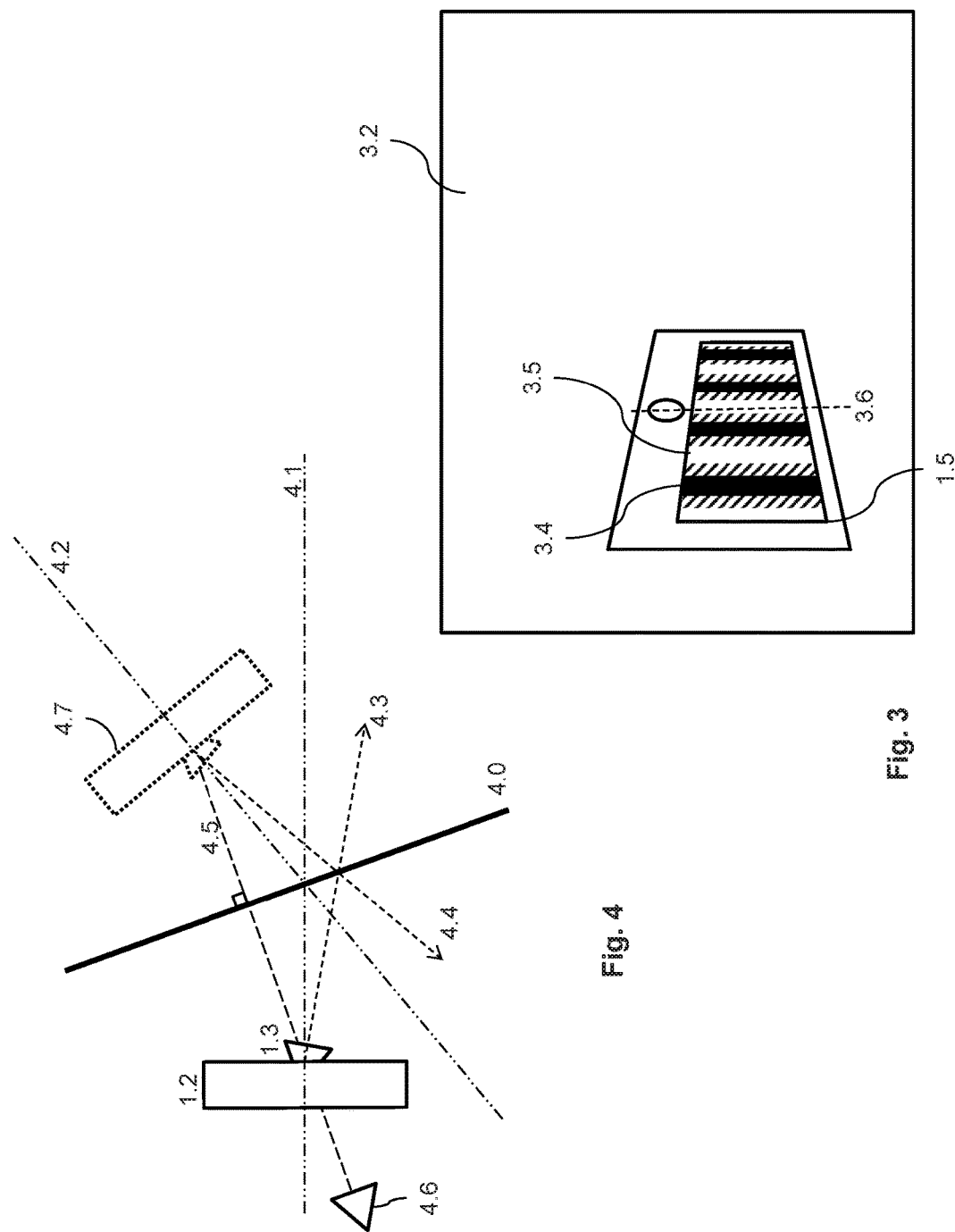

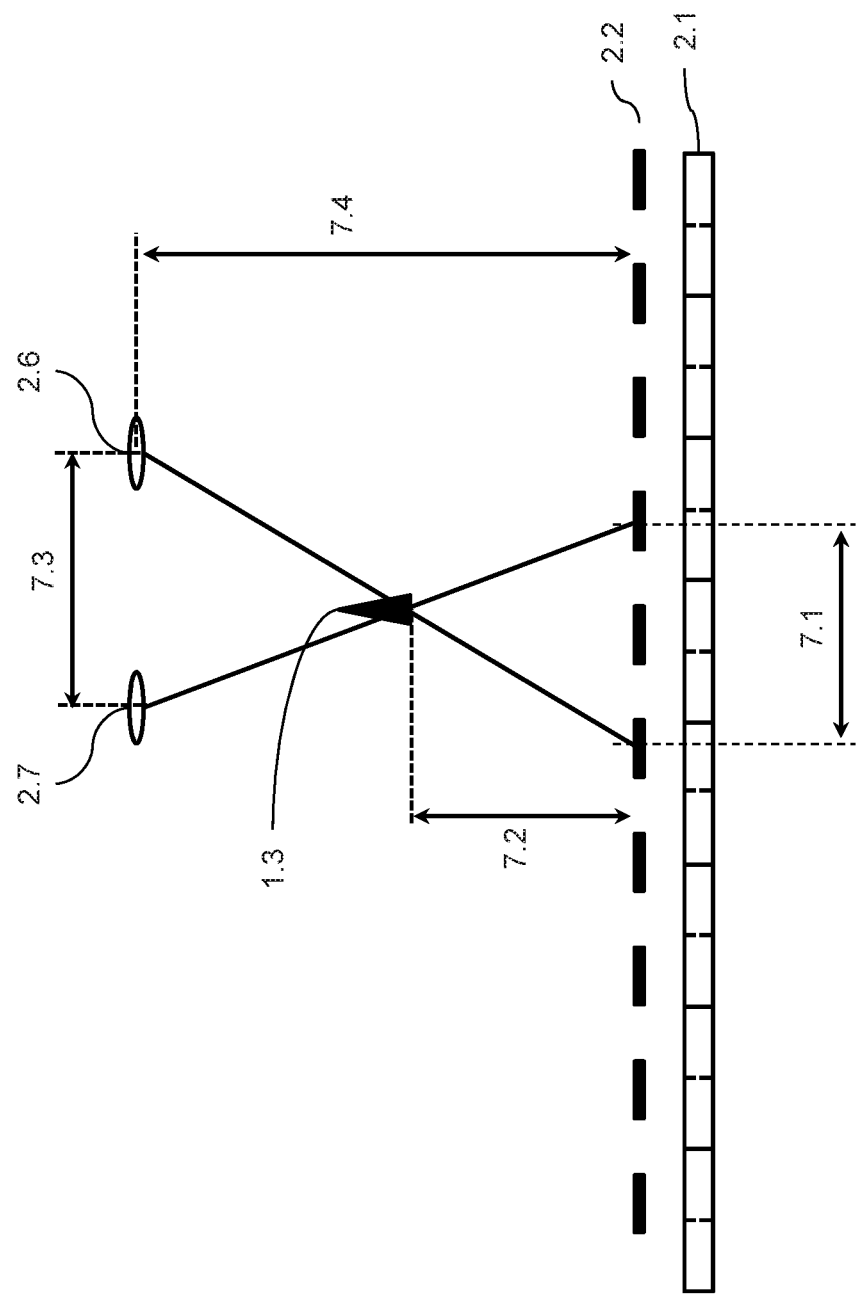

METHOD AND APPARATUS FOR CALIBRATING A DYNAMIC AUTO STEREOSCOPIC 3D SCREEN DEVICE

This application claims priority to EP Patent Application No. 15305407.7 filed 20 Mar. 2015, the entire contents of which is hereby incorporated by reference.

The present disclosure concerns a method for calibrating a dynamic auto stereoscopic three-dimensional (3D) display screen device.

An auto-stereoscopic 3D screen comprises a standard normal display screen with interleaved pixels, one pixel displaying an image for the right eye and one pixel displaying an image for the left eye. Furthermore, a mechanism ensures that one eye cannot see pixels that are not meant to be seen by the other eye. This mechanism could be a parallax barrier, or any other lens or lenticular array system, which we will name barrier as a generic term. This barrier can be placed before or behind the pixels display. This setup provides a 3D experience to a user centered in front of the screen.

A dynamic auto-stereoscopic 3D screen is designed to compensate for the movement of the user in front of the screen, to allow more freedom in the position where the 3D is viewable by the user. This compensation is achieved by shifting the barrier relatively to the pixel screen. This can be done, for example, with a parallax barrier constituted by using a high resolution LCD, which obscuring pixels can be set or unset thus creating an effect of barrier shifting.

An auto-stereoscopic 3D screen with a fixed parallax barrier is intended to be used by a user at a given position relative to the screen. This position is typically in a central position in front of the screen at a given distance of the latter. Such screens have to be meticulously assembled. Indeed, a small lateral displacement of the parallax barrier leads to a displacement of the ideal position of the user which is no longer the central position in front of the screen. Therefore the 3D experience of the user is degraded.

When using dynamic barrier, there is no need for tight tolerances of assembly in the direction orthogonal to the barrier lines, because the barrier can be shifted and adjusted, for example by turning lines on and off. This adjustment requires the knowledge of the precise horizontal phase of the barrier with respect to screen pixel matrix. Calibration of the dynamic auto-stereoscopic 3D screen is a means to determine this knowledge.

Existing solutions to calibrating the screen sometimes propose an optimization loop, in order to adjust a parameter which may be software or hardware in order to determine the phase of the barrier. This process requires a camera that records the auto stereoscopic screen, looking at a specific image pattern and a software process to find out the optimal parameter to be applied to minimize the deformation of the pattern as seen by the camera. The process is typically based on a loop comprising an adjustment phase, followed by another camera acquisition, the process being repeated until full convergence.

This process requires a complex test environment with cameras. A simpler calibration process requiring fewer resources would be advantageous.

The inventions disclosed herein have been devised to address one or more of the foregoing concerns.

The proposed solution is a calibration process for a dynamic auto-stereoscopic 3D device requiring a single image capture by the camera of the device of the auto-stereoscopic screen through a reflecting surface. The process may compute the horizontal phase of the parallax barrier from this single image capture.

According to a first aspect of the invention there is provided a method of calibration of a dynamic auto-stereoscopic 3D display screen of a device comprising a camera, characterized in that the method comprises:

displaying a pattern image on a screen of said device; and capturing an image using said camera of the device of said device comprising the screen as reflected by a reflective surface; and obtaining a rectangle resulting image of the screen; and determining the value of a command for an adjustable masking means of the dynamic auto-stereoscopic 3D screen to get a balanced mix of crosstalk in the resulting image at a horizontal position corresponding to the horizontal position of the camera in said resulting image.

In an embodiment, the rectangle resulting image is obtained by proceeding to perspective correction if the image of the screen.

In an embodiment, the pattern image is constituted by any kind of horizontal colour inversed bands.

In an embodiment, the pattern image is constituted by alternate white and black horizontal bands.

In an embodiment, determining the command for the adjustable masking means comprises:

determining the level of crosstalk for a plurality of pixels of the screen in the resulting image; and determining the horizontal period of this level of crosstalk; and determining the command for the adjustable means based on this period and on the horizontal distance between the position of the camera and the nearest extremum in the level of crosstalk.

According to another aspect of the invention there is provided a method of determining an actual command for an adjustable masking means of a dynamic auto-stereoscopic 3D screen of a device to adjust the 3D to any user present at a specific position in front of the screen, characterized in that the method comprises:

calibrating the dynamic auto-stereoscopic 3D screen of the device according to the invention; and determining the optimal distance segment representing the possible position of the user face at optimal distance from the screen; and determining a position of a user face in a captured image; and determining the actual command for the adjustable masking means based on the optimal distance segment, the position of the user face in a captured image and the value of the command determined during calibration.

In an embodiment, the optimal distance segment is determined based on the typical inter-eye distance of the user, the optimal distance of viewing of the dynamic auto-stereoscopic 3D screen and the field of view of the camera.

In an embodiment, determining the user-command for the adjustable masking means comprises:

determining a ratio of command periods corresponding to the number of command period in the optimal distance segment.

In an embodiment, it further comprise:

determining a centred command corresponding to the actual command of a user face horizontal position in the centre of the captured image; and determining the actual command based on said centred command and on said ratio of command periods.

According to another aspect of the invention there is provided a device comprising a camera and a dynamic auto-stereoscopic 3D screen, characterized in that the device comprises calibration means comprising:

a screen for displaying a pattern image on a screen of said device; and means for capturing an image using said camera of the device of said device comprising the screen as reflected by a reflective surface; and means for obtaining a resulting image of the screen by proceeding to perspective correction if the image of the screen is not rectangle; and means for determining the value of a command for an adjustable masking means of the dynamic auto-stereoscopic 3D screen to get a balanced mix of crosstalk in the resulting image at an horizontal position corresponding to the horizontal position of the camera in said resulting image.

In an embodiment, the device further comprises actual command determination means comprising:

means for determining the optimal distance segment representing the possible position of the user face at optimal distance from the screen; and means for determining a position of a user face in a captured image; and means for determining the actual command for the adjustable masking means based on the optimal distance segment, the position of the user's face in a captured image and the value of the command determined during calibration.

According to another aspect of the invention there is provided a computer program product for a programmable apparatus, the computer program product comprising a sequence of instructions for implementing a method according to the invention, when loaded into and executed by the programmable apparatus.

According to another aspect of the invention there is provided a computer-readable storage medium storing instructions of a computer program for implementing a method according to the invention.

At least parts of the methods according to the invention may be computer implemented. Accordingly, the present invention may take the form of an entirely hardware embodiment, an entirely software embodiment (including firmware, resident software, micro-code, etc.) or an embodiment combining software and hardware aspects that may all generally be referred to herein as a "circuit", "module" or "system". Furthermore, the present invention may take the form of a computer program product embodied in any tangible medium of expression having computer usable program code embodied in the medium.

Since the present invention can be implemented in software, the present invention can be embodied as computer readable code for provision to a programmable apparatus on any suitable carrier medium. A tangible carrier medium may comprise a storage medium such as a floppy disk, a CD-ROM, a hard disk drive, a magnetic tape device or a solid state memory device and the like. A transient carrier medium may include a signal such as an electrical signal, an electronic signal, an optical signal, an acoustic signal, a magnetic signal or an electromagnetic signal, e.g. a microwave or RF signal.

Embodiments of the invention will now be described, by way of example only, and with reference to the following drawings in which:

FIG. 1 illustrates the system used to describe a particular embodiment of the invention;

FIG. 3 illustrates an example of captured image by the camera in an embodiment of the invention;

FIG. 4 illustrates the optical system for the capture of the image in an embodiment of the invention;

FIG. 7 illustrates the configuration of an embodiment of the invention used to compute the optimal viewing distance;

FIG. 1 illustrates the system used to describe a particular embodiment of the invention. It is worth noting that the invention is not limited to this particular system and may be applied in numerous systems involving the same problematic.

Figure 2:
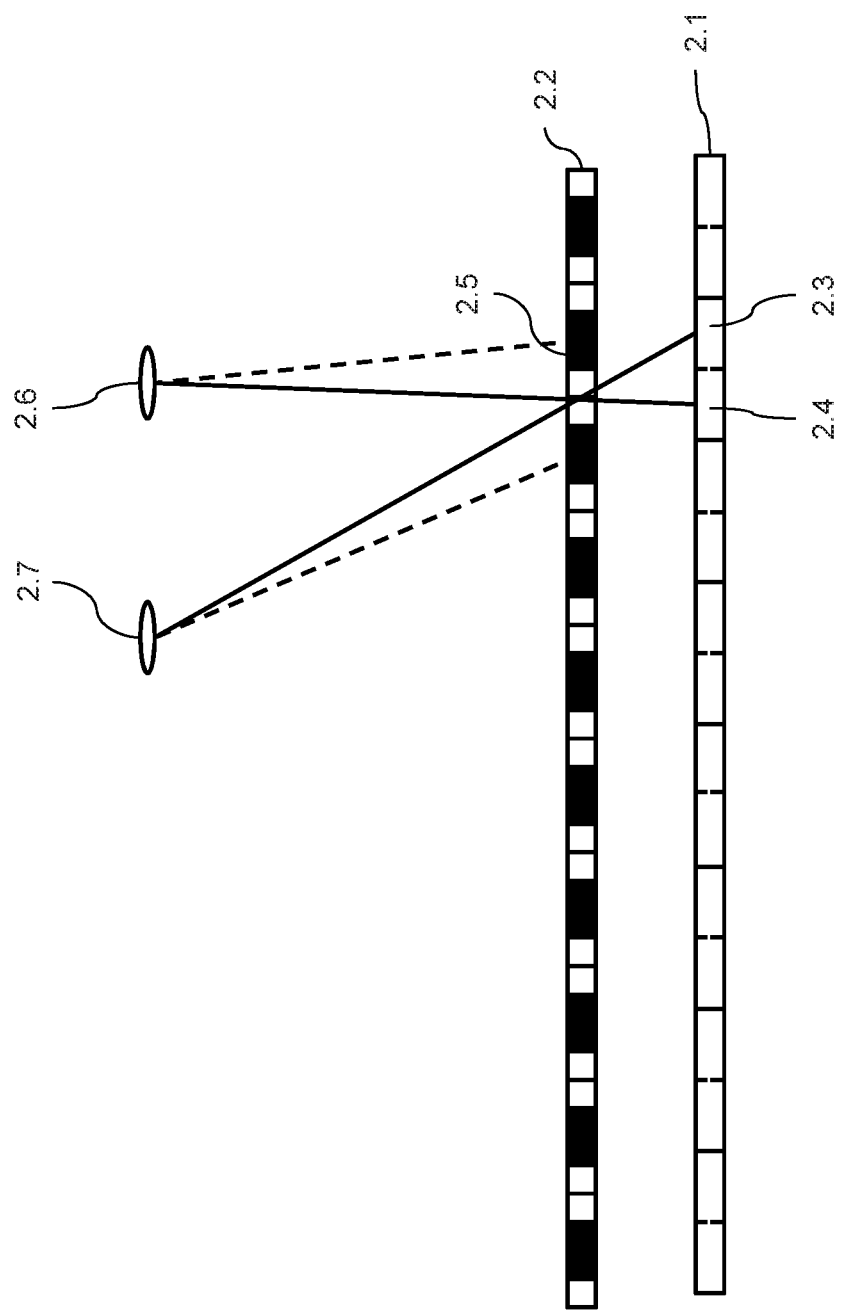
FIG. 2 illustrates the structure of a 3-D screen used in an embodiment of the invention.

A user 1.1 is using a portable device 1.2, like a portable game console, a mobile phone, a tablet computer or others. This portable device 1.2 comprises a display screen 1.4 and a camera 1.3. The camera 1.3 allows taking regular pictures of the neighbourhood of the game console, which could be continuous video. In a one use case, the user 1.1 presents his head 1.6 roughly in front of the portable device 1.2 in order to view images on the screen 1.4. This means that pictures of the head 1.5 of the user may be captured by the camera 1.3. Some well-known tracking algorithms allow tracking the head 1.5 of the user in pictures captured by the camera and particularly to identify the location of eyes or other features of the user in these pictures.

In the particular embodiment herein described, the screen 1.4 is a tri dimensional stereoscopic screen. FIG. 2 illustrates the structure of this screen. The actual screen 2.1 comprises pixels divided into two parts. One part, referenced 2.4, is used to display a left image to be visible by the left eye of the user while a second part, referenced 2.3, is used to display a right image to be visible by the right eye of the user. In order to achieve a good stereoscopic experience, the right part of the pixel should be masked to the left eye of the user, while the left part of the pixel should be masked to the right eye of the user. Masking means 2.2 are sometimes built into the screen. In our example, these masking means are made of fine stripes 2.5 that may be electronically occulted. The occulted fine stripes constitute a parallax barrier that may be displaced in front of the screen. Depending on the actual location of the eyes 2.6 and 2.7 of the user, the location of the barrier has to be adjusted in order to mask suitably the correct part of the pixels.

In order to bring to the user a good 3-D experience, the portable device 1.2 is tracking in real time the location of the head of the user in pictures captured by the camera. A face tracking algorithm identifies the location of the face within the picture. It finds the location of the eyes. The central point located between the two eyes can be taken as the reference. From the location of this central point, it may be calculated the correct location of the barrier in the screen to obtain a stereoscopic view for the user knowing the location of his face in the captured image.

When contemplating the calibration of such a dynamic auto-stereoscopic 3D device, the device is placed in front of a reflecting surface. The reflecting surface can be a mirror or any other surface alike. Doing so, an image captured by the camera of the device contains the image of the device itself and, more particularly, of the screen of the device.

FIG. 3 illustrates an example of captured image by the camera of the dynamic auto-stereoscopic device. The captured image 3.2 features a reflexion in the reflecting surface of the 3D screen 1.5.

A pattern is projected on the 3D screen, with an image different for left and right eye. For example, a white image for one eye and a black image for the other eye. It may be any other pattern allowing to determine a rate of crosstalk of a given pixel.

The crosstalk is defined for a given pixel in the captured image representing a point in the 3D screen of the mix of information coming from the left image and from the right image at this point. Namely, when ideally placed an eye of the user will only see one of the 3D image, left or right, the crosstalk would therefore be 0 or 1. For any other position, the resulting pixel will be constituted by a mix between the left image and the right image for this pixel. The crosstalk reflects the contributing part of each image, left and right.

In the case where the pattern is a white image for one eye and a black one for the other, the camera will then see vertical black and white bands 3.4 and 3.5 across the screen. Inside each band (black and white), the camera sees the pixels of one specific image, for one or the other eye, and in between a mix of the two image patterns, namely a grey level. The luminance of a given pixel is related directly to the level of crosstalk using this pattern.

FIG. 4 illustrates the optical system for the capture of the image in FIG. 3. It features the dynamic auto-stereoscopic 3D device 1.2 with its camera 1.3 in front of a reflecting surface 4.0. Axis 4.1 represents the normal to the screen. The device 4.7 in dotted lines represents the virtual image of the 3D device seen by the camera through the reflecting surface 4.0. Axis 4.2 represents the normal to the screen of the virtual device 4.7. Axis 4.3 is the optical axis of the camera while axis 4.4 is the corresponding optical axis of the virtual camera in the seen image. Line 4.5 is the line of view of an observer 4.6 watching the image of the camera. This line is perpendicular to the reflecting surface 4.0.

The calibration process takes advantage of the following properties.

An observer 4.6 of the stereoscopic 3D screen moving along the line of view 4.5 will "see" the same amount of crosstalk at the intersection of the line of view 4.5 and the stereoscopic 3D screen. This means a camera pointing to a stereoscopic screen sees a certain amount of crosstalk at the intersection of the pointing direction and the screen, and this amount does not depend of the distance to the screen.

When capturing the own image of a camera 1.3 in a reflecting surface 4.0, moving the camera on a line of view 4.5 going through the center of the camera and perpendicularly to the mirror does not change the position on the camera in the resulting image.

The resulting crosstalk pattern (3.4, 3.5) is periodic in a perspective corrected screen. In other words, the crosstalk pattern is periodic when the mirror is parallel to the screen. This also means that the resulting crosstalk pattern is not periodic if the mirror is not parallel to the screen. But using perspective transformation to correct the perspective restores as well the crosstalk pattern periodicity.

The shade of the stripe as seen towards the direction orthogonal to the reflecting surface (4.5) does not change whether the device is closer or further away from the reflecting surface. More precisely, supposing we had a camera pointing in that direction (4.6), and moving along this line, it would always see the same shade of gray in the vertical band 3.6 aligned with the camera.

Moreover, if this camera (4.6) does see a 50% gray stripe, which is the perfect balanced mix between white and black pattern representing a 50% crosstalk, then a user whose eyes would be centered on this position and at optimal distance of the auto stereoscopic 3D screen would see perfect 3D. Assuming the black and white stripes around the gray one are in the correct order, each user's eye would see totally the correct image.

Being dynamic, the auto-stereoscopic 3D screen is provided with an adjustable masking means to provide the 3D experience to the user in front of the screen. Considering a parallax barrier that may be shifted, the displacement of the barrier is periodic in its effect. For a given position of the barrier a user in front of the screen sees a given mix for each eye of the left and right image. If the barrier is suitably placed, the left eye see only the left image while the right eye see only the right image. If the barrier is not suitably placed, each eye sees a mix of the left and right images (i.e. crosstalk occurs). Displacing the barrier of a period will reproduce the same result. Based on this, it is possible to model the command to send to the adjustable masking means by a number between 0, meaning no movement, and 1 meaning a displacement of a complete period. This theoretic command may be adapted to the actual control means of the adjustable masking means under consideration in a given embodiment.

Calibration of the dynamic auto-stereoscopic 3D screen means to determine this command for a suitable placement of the adjustable masking means for a given position of the user. This command corresponds to a shift of the masking means and represents the horizontal phase of the adjustable masking means.

As already described, the pattern used for calibration must allow determining the level of cross talk in the resulting image captured by the camera through the reflecting surface. We call here the resulting image the image of the screen after perspective correction if the reflecting surface is not parallel with the screen. White and black images may be used for the left and right images. Actually, right and left images constituted by any kind of horizontal colour inversed bands may be used as well. The measured level of crosstalk is typically the same along a vertical line of the resulting image.

Let us define the intensity of the cross talk pattern horizontally on the resulting image with a function pattern=$f_{ct}$ (command, position). This function takes a first input "command" being the command sent to the adjustable masking means with a value between 0 and 1. It takes a second input "position" being the horizontal position in the resulting image with a value between 0, corresponding to the first left pixel column, and 1, corresponding to the last right pixel column. The result of the function, namely "pattern", is the level of crosstalk for these inputs which takes a value between −1 if the "position" pixel corresponds completely to the right image, for example a black pixel if the right image is black, and 1 if the "position" pixel corresponds completely to the left image, for example a white pixel if the left image is white. Values in-between represent the level of crosstalk. For example it represents the grey level in our example. A value of 0 represents the perfect balanced mix, fifty-fifty, between the left and right image, and therefore a maximum of crosstalk.

Figure 5:
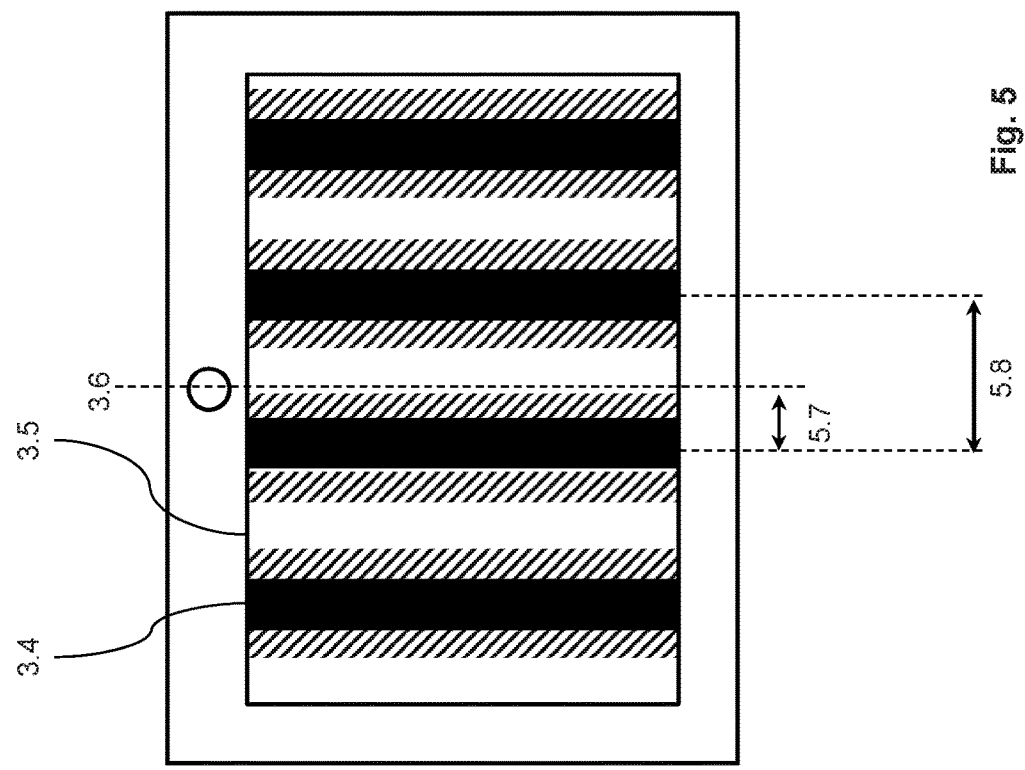
FIG. 5 illustrates the resulting image featuring black and white stripes in an embodiment of the invention.

FIG. 5 illustrates the resulting image featuring black and white stripes 3.4 and 3.5. The position of the camera is referred 3.6. Distance 5.8 represents the period of the resulting pattern. Distance 5.7 represents the distance between the central position and the nearest extremum, meaning minimum or maximum, in the resulting pattern. This extremum corresponds to a position with no crosstalk. Moreover, we will search for the "right eye" pattern extremum at the left of the camera position 3.6, or inversely for the "left eye" pattern extremum at the right of the camera position.

Figure 6:
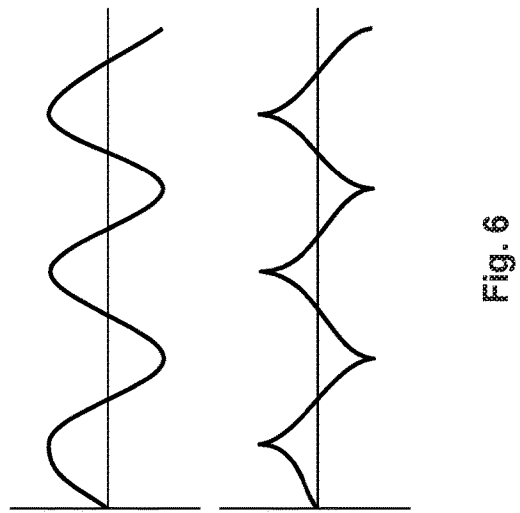
FIG. 6 illustrates some possible allure of crosstalk pattern function.

FIG. 6 illustrates some possible shapes of crosstalk pattern function $f_{ct}$. These different shapes are periodic and depend on the actual pattern used for the right an left images.

As illustrated on FIG. 6, the crosstalk pattern function $f_{ct}$ is periodic regarding the position. Naming the period $T_{ct}$, the following equation is verified:

$$f_{ct}(X,p) = f_{ct}(X, p+T_{ct}) \quad (1)$$

Determining the period $T_{ct}$ of the function $f_{ct}$ may be done by determining remarkable points of the function. For example, by determining the distance between two successive maxima or minima. If the function is too smooth, the maxima may be hard to detect with enough precision. In this case, in an embodiment, we can detect the intersection of the function $f_{ct}$ and its opposite, by creating a pattern composed of white at the top and black at the bottom for left eye, and the inverse—black at the top and white at the bottom—for right eye. This way a shift will appear in the vertical stripes, and we can detect intersection between $f_{ct}$ and $-f_{ct}$.

Alternatively, the period $T_{ct}$ may be determined from the period of the sine function best approaching the observed crosstalk pattern.

The goal of the calibration is to get a balanced mix between the right and left image at the position in the resulting image corresponding to the position of the camera $P_{cam}$ 3.6. In practice it may not be possible to achieve a perfect balanced mix, and some tolerance can be given. Assuming that the resulting image has been captured with a command C applied to the adjustable masking means, we look for the command X such as:

$$f_{ct}(X, P_{cam}) = 0 \quad (2)$$

Let us compute the ratio between the segment camera position $P_{cam}$ and nearest cross talk maxima $\text{Max}_{ct}$ (5.7) and the period $T_{ct}$ (5.8).

$$ratio_{cam} = \frac{P_{cam} - \text{Max}_{ct}}{T_{ct}}$$

Here the camera position $P_{cam}$ and nearest cross talk maxima $\text{Max}_{ct}$ are normalized values (between [0,1]) which means that any following position is computed relatively to the left side of the resulting image and normalized by the width of the image. For example here:

$$P_{cam} = \frac{CameraPosition_{pixel}}{ImageWidth_{pixel}}$$

Concerning the period with respect to the position, we know that:

$$f_{ct}(X, \text{Max}_{ct}) = -1, \ f_{ct}\left(X, \text{Max}_{ct} + \frac{T_{ct}}{2}\right) = 1 \text{ and}$$

$$f_{ct}\left(X, \text{Max}_{ct} + \frac{T_{ct}}{4}\right) = 0.$$

Moreover we know that:

$$f_{ct}\left((X+1)\bmod 1, \text{Max}_{ct} + \frac{T_{ct}}{4}\right) = f_{ct}\left(X, \text{Max}_{ct} + \frac{T_{ct}}{4}\right) = 0$$

So in fact:

$$f_{ct}\left(\left(X + \frac{P_{cam} - \text{Max}_{ct} - \frac{T_{ct}}{4}}{T_{ct}}\right)\bmod 1, \ P_{cam}\right) = 0$$

$$f_{ct}\left(\left(X + ratio_{cam} - \frac{1}{4}\right)\bmod 1, \ P_{cam}\right) = 0$$

In other words, given any barrier command C, and by analyzing the stripes period and the camera position in the resulting image, we have to add $ratio_{cam} - \frac{1}{4}$ to the command C to get a perfect 50% gray crosstalk at camera position $P_{cam}$. The command X we are looking for is such:

$$X = (C + ratio_{cam} - \frac{1}{4})\bmod 1 \quad (3)$$

For instance, if command is 0.2, and the resulting analysis gives a ratio of 0.5, then we know that the barrier command to set is 0.45 to get 50% crosstalk at camera position.

This computation can be performed in one capture shot of the resulting image, and that no other image capture is necessary to obtain the right value. Nonetheless, we can proceed to several captures typically with different commands to the barrier, to obtain different measures and average them to get a result with better precision.

It should be noted that the camera 1.3 does not have to be located above the stereoscopic screen 1.4 as depicted in FIG. 1. The camera does not have to be aligned in any way with the stripes (3.4, 3.5) seen on FIG. 5. In fact, the camera position may even be outside of the image if its position is known with respect to the resulting image. Indeed, all we need to know is the position of the camera with respect to the stripes, to be able to compute the ratio, and even without "seeing" a part of the stereoscopic screen at that place, we can determine the barrier command to send to get the balanced 50% cross talk at camera position.

The following will describe how to obtain the correct command to send to adjustable masking means of a dynamic auto-stereoscopic 3D screen of a device to adjust the 3D to any user present at a specific position in front of the screen. We call here a specific position of the user the position as identified in the captured image. This is not the absolute position in the real world relative to the device.

The typical inter-eye distance of the user and the optimal distance to the dynamic auto stereoscopic screen by fabrication is known. The field of view (FOV) of the camera is known by other calibration means. The horizontal segment size at optimal distance from the screen, delimited by the camera FOV is known. The horizontal segment is the segment representing the possible position of the user face at optimal distance from the screen for this face to be visible on the captured image. The term segment is used because the interest is in the horizontal position of the face, not its vertical position when dealing with the parallax barrier. Then we can find on the optimal distance segment, the number of barrier command periods horizontally from far left to far right. A barrier command period corresponds to the segment [0,1] command, and also matches twice the user's inter eyes distance when the user is at optimal viewing distance. In fact when the user's eyes move horizontally on the plane parallel to the screen of one inter eye distance, each eye sees exactly the wrong image, and when they move of two inter eye distance, each eye sees again exactly the good image, which corresponds to a period of barrier command. The value:

$$ratioOfCommandPeriods = 2 * \frac{intereye_{distance}}{segment_{size}}$$

represents the inverse of the number of command periods in the segment, so the ratio of the command period in the unitary segment.

It may also be expressed as:

$$ratioOfCommandPeriods = \frac{intereye_{distance}}{\tan\left(\frac{FOV_{cam}}{2}\right) * optimal_{distance}}$$

We already know the command value Y to send to get a 50% gray stripe at the camera position:

$$Y = X + ratio_{cam} - \tfrac{1}{4}$$

Now we also know that sending a command of Y+1 will yield the same result as moving spatially horizontally in the picture by an offset of ratioOfCommandPeriods. Therefore, to obtain the command Command$_{user}$ to send when the user is at a specific horizontal position User$_{position}$ in the image, we need to add the offset between the camera position and the user's position, normalized by ratioOfCommandPeriods (and modulo 1). Those positions are to be measured in the perspective corrected image (see FIG. 5).

$$Command_{user} = \left(Y + \frac{User_{position} - Camera_{position}}{ratioOfCommandPeriods}\right) \bmod 1$$

Finally:

$$Command_{user} = \left(\left(X + ratio_{cam} - \tfrac{1}{4}\right) + \frac{User_{position} - Camera_{position}}{ratioOfCommandPeriods}\right) \bmod 1$$

Where X is the command of the parallax barrier used to get the resulting image when shouting this resulting image for calibration through the reflection surface. Camera$_{position}$ is the horizontal position of the camera as identified in the resulting image. User$_{position}$ is the horizontal position of the user identified in a captured image. ratio$_{cam}$ and ratioOfCommandPeriods are computed from the resulting image as explained before.

So for instance, if the capture shot for calibration is done with command 0.2, that the analysis gives a ratio$_{cam}$=0.5, that the user position is at 0.7 and the camera position of 0.4 with a ratio of command periods of 0.26, this gives us a Command$_{user}$=0,60385 to send for the user at this position with respect to the 3D screen.

In a particular embodiment an intermediate value Command$_{atCenter}$ is computed and then used to compute the command for a given position of the user. This intermediate value corresponds to the command for a user's position at the center of the captured image:

$$Command_{atCenter} = \left(\left(X + ratio_{cam} - \tfrac{1}{4}\right) + \frac{0.5 - Camera_{position}}{ratioOfCommandPeriods}\right) \bmod 1$$

Using this intermediate value advantageously memorized, the command for any user position is given by the following equation:

$$Command_{user} = \left(\frac{User_{position} - 0.5}{ratioOfCommandPeriods} + Command_{atCenter}\right) \bmod 1$$

In conclusion, the calibration process allows us to determine, in a single image capture shot, the two parameters necessary to pilot the auto stereoscopic screen barrier for any user's position: Command$_{atCenter}$ and ratioOfCommandPeriods, the user's position being the horizontal position of the user's face in the captured image.

In the foregoing we used in the computation an optimal distance of viewing with respect to the auto stereoscopic screen given by the manufacturer. To go further, this distance can be determined with the same acquisition capture. As shown in FIG. 7, a camera 1.3 is pointing towards the auto stereoscopic 3D screen (2.1, 2.2), seeing cross talk—black and white stripes—of half period $$\frac{T_{ct}}{2}$$

(7.1). The half period corresponds to the distance from one black maximum to one white maximum. This camera is at distance distance$_{camera}$ (7.2) of the screen, which is twice the distance to the mirror distance$_{toMirror}$. The optimal distance of viewing is where each eye (2.6, 2.7) spaced out of intereye$_{distance}$ (7.3) is seeing only the black image or the white image. This means we have the relation:

$$\frac{Optimal_{distance} - distance_{camera}}{distance_{camera}} = \frac{intereye_{distance}}{\frac{stripes_{period}}{2}}$$

Note that stripes$_{period}$ is a distance unit (millimeter for instance), and that it is defined by:

$$stripes_{period} = T_{ct} * \frac{ImageWidth_{pixel} * ScreenWidth_{mm}}{ScreenWidth_{pixel}}$$

The optimal distance of viewing is then defined by:

$$Optimal_{distance} = 2 * distance_{toMirror}\left(\frac{2 * intereye_{distance} * ScreenWidth_{pixel}}{T_{ct} * ImageWidth_{pixel} * ScreenWidth_{mm}} + 1\right)$$

Thus, it can be seen here why the camera should not be placed near the optimal distance with respect to the screen, because the period T$_{ct}$ would be infinite.

This calculation is done when the dynamic auto stereoscopic screen is parallel to the mirror, and with a camera pointing towards the mirror.

Figure 8:
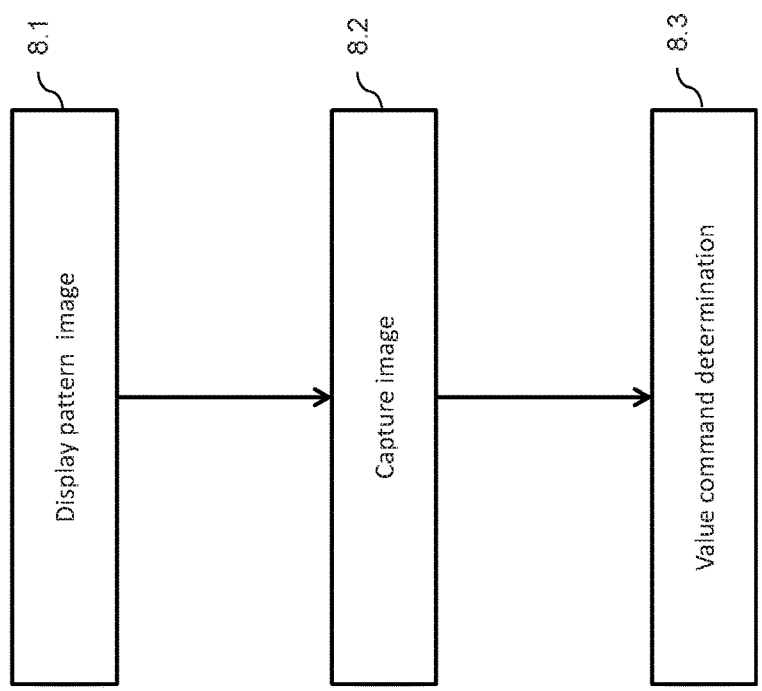
FIG. 8 illustrates a flow charts of the calibration method according to an embodiment of the invention.

FIG. 8 illustrates a flow charts of the calibration method according to an embodiment of the invention corresponding to the description above.

In step 8.1, a pattern is displayed on the 3D screen, with an image different for left and right eye. For example, a white image for one eye and a black image for the other eye. It may be any other pattern allowing to determine a rate of crosstalk of a given pixel.

In step 8.2, the device captures an image of itself through a reflecting surface like a mirror. This image comprises the 3D screen of the device. In case the shooting conditions do not guarantee that the obtained image of the screen of the device is rectangle, a step of perspective correction is applied. The result of this step is therefore an image containing a rectangle view of the screen of the device.

In step 8.3, the value of a command for a suitable placement of the adjustable masking means for a given position of the user is determined. This command corresponds to a shift of the masking means and represents the horizontal phase of the adjustable masking means. This command is not applied to the masking means, only its value is considered as the result of the calibration. This value may be used in the determination of an actual command determined based on the actual position of a user in front of the screen. This value of command, if applied to the masking means, allows getting a balanced mix of crosstalk in the resulting image at a horizontal position corresponding to the horizontal position of the camera in said resulting image.

Figure 9:
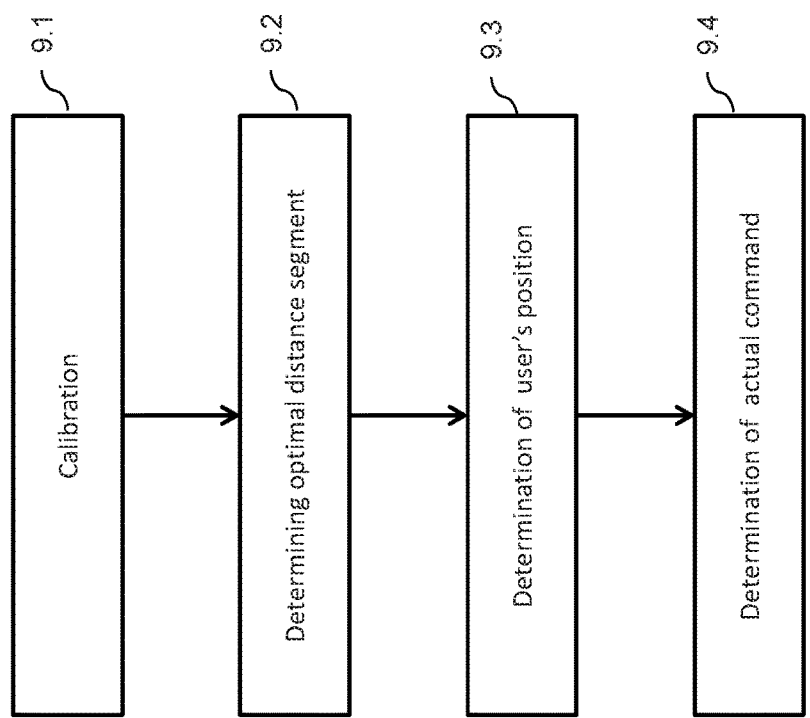
FIG. 9 illustrates a flow charts of the actual command determination for an actual user in front of the screen according to an embodiment of the invention.

FIG. 9 illustrates a flow charts of the actual command determination for an actual user in front of the screen according to an embodiment of the invention.

In step 9.1, the calibration of the dynamic auto-stereoscopic 3D screen occurs. This calibration may be done using the method described in relation to FIG. 8.

In step 9.2, the optimal distance segment representing the possible position of the user face at optimal distance from the screen is determined.

In step 9.3, a position of a user face in a captured image is determined.

In step 9.4, the actual command for the adjustable masking means is determined based on the optimal distance segment, the position of the users face in a captured image and the value of the command determined during calibration.

Figure 10:
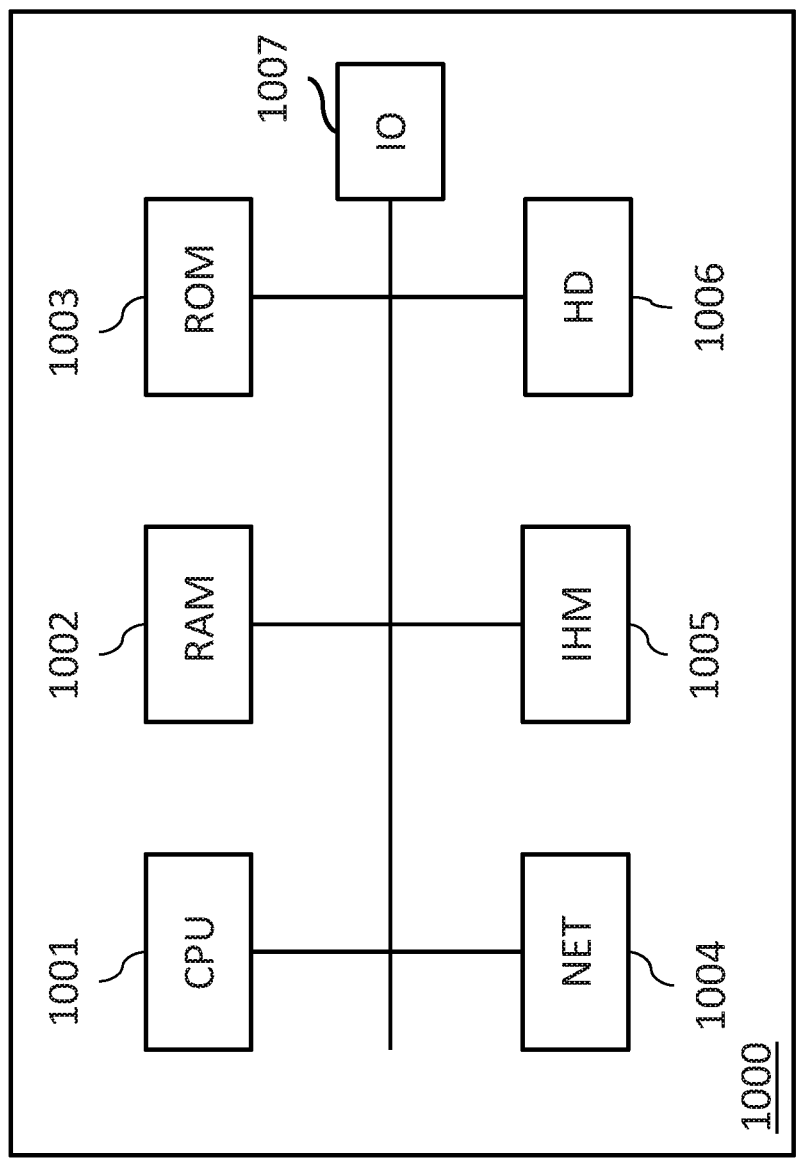
FIG. 10 is a schematic block diagram of a computing device for implementation of one or more embodiments of the invention.

FIG. 10 is a schematic block diagram of a computing device 1000 for implementation of one or more embodiments of the invention. The computing device 1000 may be a device such as a micro-computer, a workstation or a light portable device (e.g. a tablet, cellular phone, portable gaming device, among other possibilities). The computing device 1000 comprises a communication bus connected to:

a central processing unit 1001, such as a microprocessor, denoted CPU;

a random access memory 1002, denoted RAM, for storing the executable code of the method of embodiments of the invention as well as the registers adapted to record variables and parameters necessary for implementing the method for encoding or decoding at least part of an image according to embodiments of the invention, the memory capacity thereof can be expanded by an optional RAM connected to an expansion port for example;

a read only memory 1003, denoted ROM, for storing computer programs for implementing embodiments of the invention;

a network interface 1004 is typically connected to a communication network over which digital data to be processed are transmitted or received. The network interface 1004 can be a single network interface, or composed of a set of different network interfaces (for instance wired and wireless interfaces, or different kinds of wired or wireless interfaces). Data packets are written to the network interface for transmission or are read from the network interface for reception under the control of the software application running in the CPU 1001;

a user interface 1005 may be used for receiving inputs from a user or to display information to a user;

a hard disk 1006 denoted HD may be provided as a mass storage device;

an I/O module 1007 may be used for receiving/sending data from/to external devices such as a video source or display.

The executable code may be stored either in read only memory 1003, on the hard disk 1006 or on a removable digital medium such as for example a disk. According to a variant, the executable code of the programs can be received by means of a communication network, via the network interface 1004, in order to be stored in one of the storage means of the communication device 1000, such as the hard disk 1006, before being executed.

The central processing unit 1001 is adapted to control and direct the execution of the instructions or portions of software code of the program or programs according to embodiments of the invention, which instructions are stored in one of the aforementioned storage means. After powering on, the CPU 1001 is capable of executing instructions from main RAM memory 1002 relating to a software application after those instructions have been loaded from the program ROM 1003 or the hard-disc (HD) 1006 for example. Such a software application, when executed by the CPU 1001, causes the steps of the algorithms herein disclosed to be performed.

Any step of the algorithm herein disclosed may be implemented in software by execution of a set of instructions or program by a programmable computing machine, such as a PC ("Personal Computer"), a DSP ("Digital Signal Processor") or a microcontroller; or else implemented in hardware by a machine or a dedicated component, such as an FPGA ("Field-Programmable Gate Array") or an ASIC ("Application-Specific Integrated Circuit").

Although the present invention has been described hereinabove with reference to specific embodiments, the present invention is not limited to the specific embodiments, and modifications will be apparent to a skilled person in the art which lie within the scope of the present invention.

Many further modifications and variations will suggest themselves to those versed in the art upon making reference to the foregoing illustrative embodiments, which are given by way of example only and which are not intended to limit the scope of the invention, that being determined solely by the appended claims. In particular the different features from different embodiments may be interchanged, where appropriate.

In the claims, the word "comprising" does not exclude other elements or steps, and the indefinite article "a" or "an" does not exclude a plurality. The mere fact that different features are recited in mutually different dependent claims does not indicate that a combination of these features cannot be advantageously used.

The invention claimed is:

1. A method of calibrating a dynamic auto-stereoscopic 3D screen of a device comprising a camera, the method comprising:

displaying a pattern image on a screen of said device;
capturing an image of said device using said camera, the captured image of said device comprising the screen of said device as reflected by a reflective surface;
based on the captured image, obtaining a rectangular resulting image of the screen; and
processing the obtained rectangular resulting image of the screen to determine the value of a command for an adjustable masking of the dynamic auto-stereoscopic 3D screen to get a balanced mix of crosstalk in the resulting image at a horizontal position corresponding to the horizontal position of the camera in said resulting image.

2. The method of claim 1, wherein the rectangular resulting image is obtained by proceeding to perspective correction if the captured image of the screen is not rectangular.

3. The method of claim 1 wherein the pattern image is constituted by vertical colour inversed bands.

4. The method of claim 3 wherein the pattern image is constituted by alternate white and black horizontal bands.

5. The method of claim 1 wherein determining the command for the adjustable masking comprises:
determining the level of crosstalk for a plurality of pixels of the screen in the resulting image;
determining the horizontal period of this determined level of crosstalk; and
determining the command for the adjustable masking based on the determined period and on the horizontal distance between the position of the camera and the nearest extremum in the level of crosstalk.

6. A method of determining a command for an adjustable masking of a dynamic auto-stereoscopic 3D screen of a device to adjust the 3D to any user present at a specific position in front of the screen, the method comprising:
calibrating the dynamic auto-stereoscopic 3D screen of the device according to claim 1;
determining the optimal distance segment representing the possible position of a user face at optimal distance from the screen to be visible on the captured image;
determining a position of the user face in a captured image; and
determining the command for the adjustable masking based on the optimal distance segment, the position of the user's face in a captured image and the value of the command determined during calibration.

7. The method of claim 6 wherein the optimal distance segment is determined based on a typical inter-eye distance of the user, the optimal distance of viewing of the dynamic auto-stereoscopic 3D screen and the field of view of the camera.

8. The method of claim 6 wherein determining the command for the adjustable masking comprises:
determining a ratio of command periods corresponding to the number of command periods in the optimal distance segment, the command period being twice the user's inter-eye distance when the user is at a particular viewing distance.

9. The method of claim 8 further comprising:
determining a centered command corresponding to the command of a user face horizontal position in the center of the captured image; and
determining the command based on said centered command and on said ratio of command periods.

10. A device comprising a camera and a dynamic auto-stereoscopic 3D screen, the device comprising:
a screen for displaying a pattern image;
a camera for capturing an image of the screen of said device as reflected by a reflective surface; and
at least one processor connected to receive the captured image, the at least one processor being configured to obtain a resulting image of the screen by proceeding to perspective correction if the captured image of the screen is not rectangular, and determining the value of a command for an adjustable masking of the dynamic auto-stereoscopic 3D screen to get a balanced mix of crosstalk in the resulting image at an horizontal position corresponding to the horizontal position of the camera in said resulting image.

11. A device according to claim 10 wherein the at least one processor is further configured to:
determine an optimal distance segment representing the possible position of a user face at optimal distance from the screen;
determine a position of a user face in a captured image; and
determine the command for the adjustable masking based on the optimal distance segment, the position of the user's face in a captured image and the value of the command determined during calibration.

12. A non-transitory computer program storage product for a programmable apparatus, the computer program storage product storing information comprising a sequence of instructions for implementing a method, when loaded into and executed by the programmable apparatus, of:
displaying a pattern image on a dynamic auto-stereoscopic 3D screen;
capturing an image comprising the screen as reflected by a reflective surface;
based on the captured image, obtaining a rectangular resulting image of the screen; and
processing the obtained rectangular resulting image of the screen to determine the value of a command for an adjustable masking of the dynamic auto-stereoscopic 3D screen to get a balanced mix of crosstalk in the resulting image at a horizontal position corresponding to the horizontal position of the camera in said resulting image.

13. A device comprising:
a dynamic auto-stereoscopic 3D screen for displaying a pattern image;
a camera for capturing an image of the screen of said device reflected by a reflective surface; and
a calibrator structured to:
obtain a resulting image of the screen by correcting perspective of the captured image of the screen if the captured image of the screen is not rectangular; and
determine a value of a command for an adjustable masking of the dynamic auto-stereoscopic 3D screen to get a balanced mix of crosstalk in the resulting image at an horizontal position corresponding to the horizontal position of the camera in said resulting image.

14. The device of claim 13, wherein the calibrator obtains the resulting image by perspective correction if the captured image of the screen is not rectangular.

15. The device of claim 13 wherein the pattern image comprises vertical color inversed bands.

16. The device of claim 15 wherein the pattern image comprises alternate white and black horizontal bands.

17. The device of claim 13 wherein the calibrator is further configured to determine the command for the adjustable masking by:

determining the level of crosstalk for a plurality of pixels of the screen in the resulting image;
determining the horizontal period of this determined level of crosstalk; and
determining the command for the adjustable masking based on the determined period and on the horizontal distance between the position of the camera and the nearest extremum in the level of crosstalk.

* * * * *